United States Patent [19]

Smith

[11] Patent Number: 5,079,873

[45] Date of Patent: Jan. 14, 1992

[54] PROGRAMMED AIR LEAK FOR DEFLATABLE WEATHERSTRIP SYSTEM

[75] Inventor: Jack E. Smith, Dayton, Ohio

[73] Assignee: General Motors Corporation, Detroit, Mich.

[21] Appl. No.: 650,553

[22] Filed: Feb. 1, 1991

Related U.S. Application Data

[63] Continuation-in-part of Ser. No. 403,954, Sep. 7, 1989, Pat. No. 4,989,370, which is a continuation-in-part of Ser. No: 380,421, Jul. 17, 1989, Pat. No. 4,995,196.

[51] Int. Cl.⁵ .............................................. E06B 7/16
[52] U.S. Cl. ......................................... 49/477; 92/34; 92/137
[58] Field of Search ...................... 49/477, 475; 92/34, 92/137

[56] References Cited

U.S. PATENT DOCUMENTS

| | | |
|---|---|---|
| 300,877 | 6/1884 | Lawrence . |
| 1,283,416 | 10/1918 | Kuehn . |
| 2,104,144 | 1/1938 | Zand . |
| 2,377,461 | 6/1945 | Swift . |
| 2,908,948 | 10/1959 | Jones .................................. 20/16 |
| 2,947,470 | 8/1960 | Ruben et al. . |
| 2,979,907 | 4/1961 | Price . |
| 3,100,918 | 8/1963 | Coverley ............................. 20/19 |
| 3,103,685 | 9/1963 | McCleery et al. . |
| 3,528,344 | 9/1970 | Rabenhorst . |
| 3,747,275 | 7/1973 | May et al. ........................... 49/477 |
| 3,968,597 | 7/1976 | Hirtle . |
| 4,761,917 | 8/1988 | Knecht et al. ....................... 49/477 |
| 4,805,347 | 2/1989 | Smith .................................... 49/477 |

FOREIGN PATENT DOCUMENTS

59-8525 1/1984 Japan .

Primary Examiner—Gary L. Smith
Assistant Examiner—Michael J. Milano
Attorney, Agent, or Firm—Ronald L. Phillips

[57] ABSTRACT

A deflatable sealing member forms a weatherstrip to seal a closure opening. The sealing member includes an operative tubular section designed to provide tight interference engagement between the closure and vehicle body when vented to atmosphere and expanded by built-in resilient memory. A bellows pump is connected to the sealing member through a flow control circuit. The bellows pump serves to deflate the sealing member during closing of the closure. The bellows pump is adapted for convenient mounting in a cavity in the closure or vehicle body spaced from the closure hinge area. A flexible cable connects the bellows pump to the closure or vehicle body to provide the necessary actuation for operation of the bellows pump in response to the swinging movement of the closure. As the closure closes, a bleed port of fixed or variable size located at the pump vents the sealing member to ambient pressure, and the sealing member expands by resilient memory to its full cross section so as to provide a tight seal.

3 Claims, 4 Drawing Sheets

PROGRAMMED AIR LEAK FOR DEFLATABLE WEATHERSTRIP SYSTEM

This is a continuation-in-part of U.S. application Ser. No. 07/403,954 filed Sept. 7, 1989, now U.S. Pat. No. 4,989,370 which is a continuation-in-part of U.S. application Ser. No. 07/380,421 filed July 17, 1980 now U.S. Pat. No. 4,995,196.

The present invention relates generally to the sealing of closures and, more particularly, to a sealing apparatus for a vehicle closure that requires relatively low closing effort but provides an exceptionally firm, tight seal.

BACKGROUND OF THE INVENTION

Closed cell sponge weatherstrips have been the standard for years to seal vehicle closures against the passage of air and moisture. The weatherstrip attaches to the vehicle body or closure around the opening (e.g. door or trunk opening). The weatherstrip preferably includes a bulbular or tubular section that is designed to provide an interference fit between the closure and body, and a mounting section to secure the weatherstrip in place. When the door or trunk lid is closed, the weatherstrip mechanically flexes according to the degree of interference. Generally, the greater the interference, the better the sealing function is obtained.

Good sealing of closures is particularly important in vehicles in order to isolate the passengers from inclement weather conditions; namely, precipitation as well as excessively hot or cold air. Since the vehicle moves through the air, it is also important to the comfort of the passengers to minimize the wind noise. It should be recognized, however, that the high degree of interference of the weatherstrip between the door and door frame required for good sealing unfortunately increases the closing effort.

Another consideration for vehicle weatherstrip design relates to an annoying problem known as "compression shock". With the improved closure sealing, the rapid closing of a door on an otherwise closed vehicle often results in a momentary air compression in the passenger compartment. In essence, trapped air inside the compartment cannot escape past the tight weatherstrip seals around the various closures. This problem is particularly acute in designs where the closure moves substantially transverse to the body, such as in conventional swinging doors or hatch back lids. This compression shock not only further increases the closing effort required but also causes an unpleasant feeling to the passengers.

Attempts to reduce door closing effort have in the past resulted in reduced sealing efficiency. Conversely, past attempts to emphasize improved sealing have resulted in a need for excessive closing effort. Neither extreme is favored by consumers. Thus, automotive engineers have found it necessary to compromise these conflicting engineering requirements, with the best designs heretofore carefully balancing the relationship between sealing and closing effort.

Some efforts in the past have addressed the seemingly conflicting concerns and provided some limited improvement. For example, space bleed apertures have been formed along the entire length of weatherstrip so air is not entrapped as it is compressed inside the weatherstrip when the closure is closed. More specifically, the apertures insure that the internal air pressure is ambient at all times. Thus, mechanical flexing of the weatherstrip remains the principal design criteria for sealing with this improvement. Advantageously, by eliminating air entrapment, the closing effort for a rapidly closing door is reduced. Still, it should be recognized that this approach is not effective in improving the sealing efficiency since the interference fit is not appreciably increased.

Another idea that has gained some acceptance in the automotive industry recently is to employ at least two weatherstrips in juxtaposition to seal together when the door or lid is closed. The engaging parts of the weatherstrips are designed to form a labyrinth seal, and as a result some improved sealing is obtained. Of course, with this arrangement the degree of interference fit commensurate with easy closing is still sorely limited, and the cost of forming the seal is substantially increased.

Another approach that has been proposed for vehicles is to make the weatherstrips inflatable. The basic idea is that when the door is closed, a positive pressure (greater than ambient pressure) is applied inside the closed tubular weatherstrip to provide expansion against the door and door frame, thus providing increased interference and an improved seal. As will be recognized, this approach does reduce the door closing effort and compression shock because the non-inflated weatherstrip does not engage in an interference fit with the door and the door frame until the door is closed and the superatmospheric pressure is applied.

This concept, while useful in aircraft and aerospace vehicles, presents problems when attempts have been made to adapt it to general automotive use. First, in order to provide a closure sealing system using the superatmospheric pressure concept, a sophisticated air pressure supply system that is highly reliable must be provided. This is so since if air pressure is lost, a complete failure of the sealing function results and the interior is susceptible to damage from water leakage, as well as the passengers being exposed to extremes of hot and cold atmospheric conditions and excessive wind noise. Furthermore, such a sophisticated air pressure system is relatively expensive, and thus adding such auxiliary equipment is not conducive to competitive pricing of a consumer product, such as an automobile.

Similarly, the superatmospheric inflatable weatherstrip must not lose pressure over extended periods of time. To guard against this in an automotive system where small, pin-hole leaks are inevitable, especially after several years of use, an electric pump would be required to be periodically energized to maintain the optimum sealing pressure. Such a condition would inevitably lead to the need for increased storage capacity of the electrical battery in the automobile, and under extended periods of inactivity of the automobile, complete discharge of the battery. Additionally, the superatmospheric pressure system must provide relatively sophisticated regulators to compensate for variations in ambient pressure conditions, such as due to altitude and barometric pressure variations, as well as temperature variations. Such additional cost adds to the prohibitiveness of using this type of system on a high volume consumer product, such as an automobile.

The most effective approach to date for providing both improved sealing and easier closing of vehicular closures is set forth in U.S. Pat. Nos. 4,761,917 and 4,805,347 assigned to the assignee of this invention. With this approach, a deflatable sealing member forms a weatherstrip to seal the opening in the vehicle body around the closure. The sealing member is connected to a vacuum source such as a bellows pump. When the closure is closed, the sealing member is deflated so as not to engage in an interference fit between the door and closure. In this manner, closing effort is reduced and compression shock eliminated. Following closing, the sealing member is vented to ambient pressure by a valve arrangement. This causes the sealing member to expand by built-in resilient memory to provide firm sealing engagement with increased resilient interference between the closure and the body.

SUMMARY OF THE INVENTION

This approach has proven successful in reconciling the seemingly conflicting problems of excessive closing effort and tight sealing but does present a significant additional cost. The present invention addresses this cost problem by providing a closure sealing mechanism with a bellows pump actuated by closure movement as before but without a vacuum venting valve. Instead, a programmed air leak or bleed is designed into the system preferably at the bellows that allows the latter to overcome such leak during normal swift closing action but also allows for a reasonable fast bleed-off of the vacuum to permit weatherstrip sealing action shortly after latching.

Accordingly, it is a primary object of the present invention to provide a new and improved sealing apparatus and method overcoming the above-described limitations and disadvantages of the prior art.

Another object of the present invention is to provide a sealing apparatus for swinging vehicular closures that provides the seemingly conflicting advantages of both reduced closing effort and good interference sealing without a vacuum control valve.

Still another object of the present invention is the provision of an improved sealing apparatus for a closure including a deflatable sealing member connected to a bellows pump specially adapted without vacuum break valve control for convenient mounting in a hollow section of the closure or frame adjacent but spaced from the hinge area of the closure.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an apparatus is provided for tightly sealing a vehicular closure such as a swinging door, hatch back door or trunk lid of an automobile. The apparatus includes a resilient sealing member having a deflatable bulbular or tubular section. The sealing member also includes a mounting section to fix the sealing member either around the inner peripheral margin of the closure or to the vehicle body around the entire periphery of the opening. When the door is closed and the sealing member inflated, a tight interference seal is provided between the door and the body that prevents the passage of air and moisture.

A vacuum source, in the form of a bellows pump, is connected to the sealing member. When the negative pressure of the bellows pump is applied to the sealing member, the tubular section deflates and collapses. Conversely, when air and ambient pressure is readmitted to the sealing member, the tubular section reexpands due to its resilient memory.

More specifically, the bellows pump includes a mounting end specifically adapted for mounting the bellows pump to the closure or the vehicle body. The opposite end of the bellows pump is relatively displaceable for actuating the bellows. Where the bellows pump is mounted to the vehicle body, the relatively displaceable end of the bellows pump is connected to the closure. Conversely, when the bellows pump is mounted to the closure, the relatively displaceable end is connected to the vehicle body. In this manner, the bellows pump is adapted to be compressed in response to the relative movement as the closure is opened, and expanded as the closure is closed.

A flow control circuit provides fluid communication between the deflatable sealing member, the bellows pump and the ambient atmosphere to control the deflation and inflation of the sealing member. The usual intake and exhaust valves are provided for the pump but now instead of a vacuum break or venting valve, there is now simply provided a leak port at the pump. According to the present invention, this flow circuit simply comprises a continuously open line connection between the sealing member and the pump and a leak port in the bellows that provides limited communication between the latter and atmosphere.

The leak port is designed so as to be overcome by the bellows during normal swift closing action so that negative (subatmospheric) pressure is applied at a sufficient rate to deflate the sealing member as the door is closed. With the sealing member deflated and thus collapsed, the degree of interference between the sealing member and the door or door frame is reduced, or even substantially eliminated. Thus, the force required to overcome the interference and latch the door is advantageously reduced proportionally. Consequently, a desirable, relatively low closing effort is all that is required to operate the door. In addition, it should be recognized that because the operative tubular section of the sealing member is collapsed so that a space exists between the sealing member and the closure or closure frame, passage of air from the interior of the vehicle is allowed to avoid compression shock.

After the closure is closed and air is released past the sealing member as described, the leak port readmits air at ambient pressure at a reasonably fast rate to the sealing member to reestablish sealing. Because of its inherent resiliency, the sealing member then assumes the desired interference fit/sealing engagement between the closure and closure frame. Advantageously, when the operative tubular section is expanded, the sealing member provides the desired increased resilient interference that is not possible with presently utilized closed cell sponge weather stripping without increasing the closing effort to unacceptable extremes. Of course, it is possible to provide the improved sealing without raising the required closing effort with the present system since the sealing member is collapsed when the closure is initially closed.

In order to absorb and suppress shock when the closure is initially closed, the sealing member may include a non-deflatable bumper portion. Preferably, the bumper portion is integrally formed as a part of the sealing member that substantially retains its original cross section when subjected to negative pressure.

The means for connecting the relatively displaceable end of the bellows pump to the closure or vehicle body, preferably, includes a cable. This cable is attached to the displaceable end of the bellows pump and extends through the bellows body and mounting end of the bellows pump to a connection point on either the closure or the vehicle body. A sealing element provided on the mounting end of the bellows pump engages the cable so as to prevent the passage of air between the atmosphere and the interior of the bellows other than through the leak port which is preferably formed in this end (the mounting end) of the bellows. The seal, of course, is also adapted to allow the cable to slide back and forth through the mounting end of the bellows thus allowing actuation of the bellows pump as the closure is opened and closed.

The flow circuit connecting the bellows pump, deflatable sealing member and atmosphere, since it has no operating valves and attendant operating means, is not only less costly than the prior art devices it is also more reliable as well as simpler to manufacture and maintain. Moreover, the pump containing the leak port may be conveniently mounted in a cavity or open space in the closure or vehicle body adjacent or remote from the hinge area of the door. Thus, the complete apparatus of the present invention may be very simply incorporated into vehicles as presently designed. Consequently, the present apparatus eliminates any need to redesign the hinge area of a vehicle closure to accommodate the bellows pump. In addition, the leak port can be made adjustable with a simple valve to accommodate different or changing leak requirements that are not possible to meet with a fixed leak port size (diameter). With the adjustable leak port, only one manufactured design then need be made to suit a wide range of usage.

Still other objects of the present invention will become readily apparent to those skilled in this art from the following description wherein there is shown and described a preferred embodiment of this invention, simply by way of illustration of one of the modes and alternative embodiments best suited to carry out the invention. As will be realized, the invention is capable of still other different embodiments and its several details are capable of modifications in various obvious aspects, all without departing from the invention. Accordingly, the drawing and description will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing.

DETAILED DESCRIPTION OF THE INVENTION

Figures 1, 2, 3, 3A:
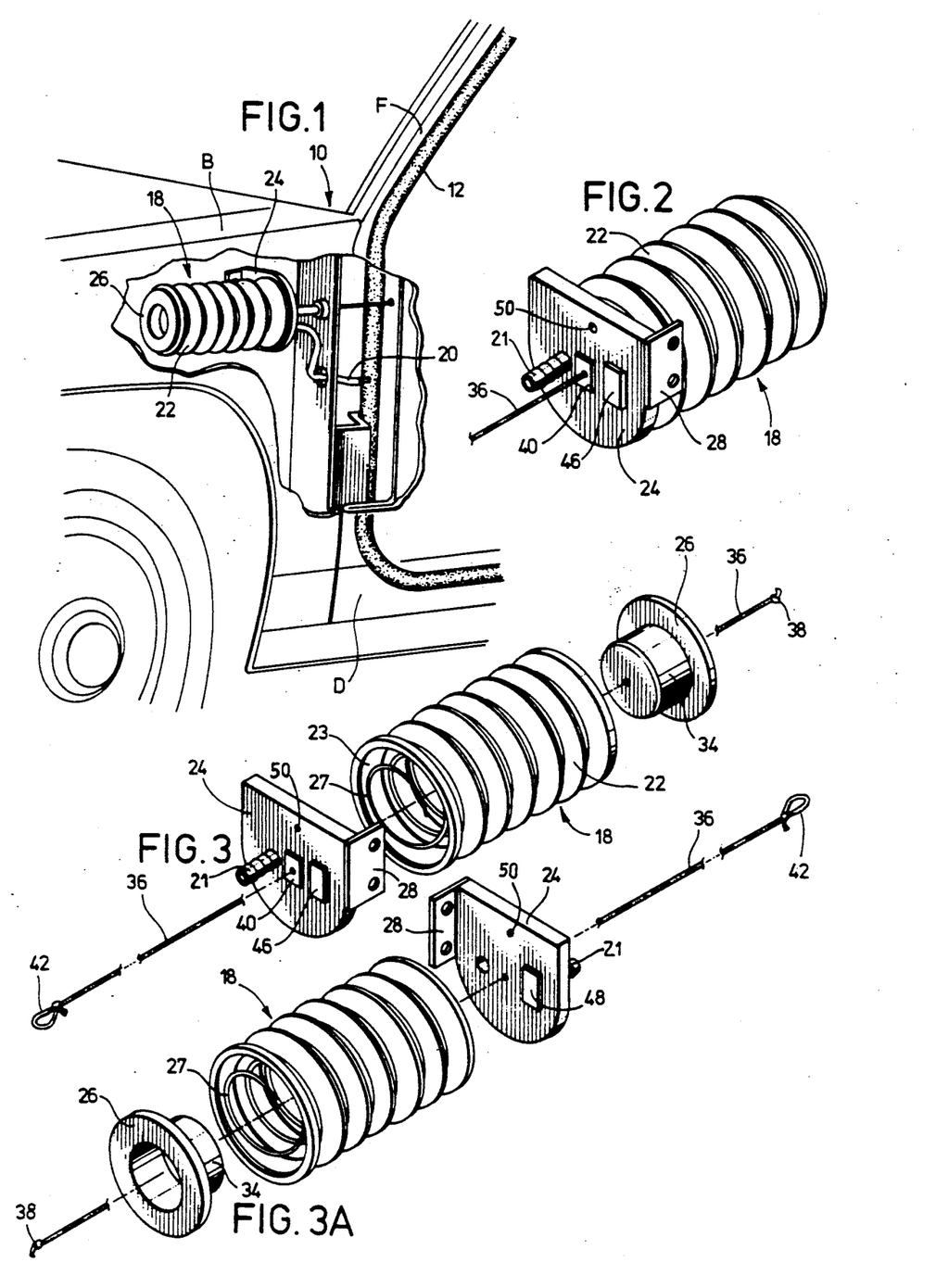
FIG. 1 is a broken-away side view of a vehicle equipped with the apparatus of the present invention for sealing between a closure and a body.
FIG. 2 is a perspective view of the bellows forming a part of the apparatus of the present invention.
FIGS. 3 and 3A show front and rear exploded perspective views of the bellows pump of the apparatus of the present invention.
Figure 4:
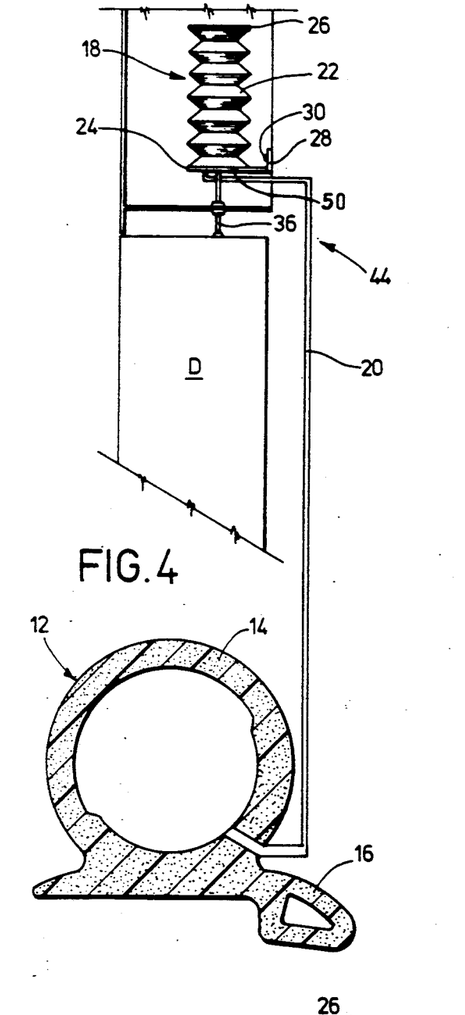
FIG. 4 is a schematical representation showing the apparatus of the present position when the closure is closed.
Figure 4A:
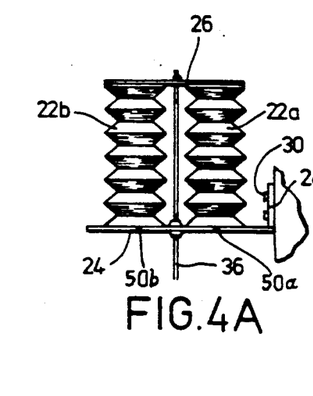
FIG. 4A is a side view representation showing the bellows pump with a double bellows in the expanded position assumed when the closure is closed.

Reference is now made to the drawing figures showing the system or apparatus 10 of the present invention for tightly sealing a closure, such as a door D on an automobile. As best shown in FIGS. 1 and 4, the apparatus 10 includes a sealing member or weatherstrip 12 having a bulbular or tubular section 14 (see FIGS. 4, 5). The sealing member 12 is mounted to the face F of the door frame or vehicle body B by means of a mounting section 16. A one-way clip (not shown), adhesive or any other appropriate means known in the art, may be utilized to secure the sealing member 12 in place.

The sealing member 12 is constructed of EPDM or other elastomeric material. In this way, the sealing member 12 is provided with sufficient resiliency to furnish a tight sealing engagement with the door D when in the closed position with the sealing member 12 expanded by venting to atmosphere (again, see FIG. 4). Of course, since the sealing member 12 forms a ring extending around the entire periphery of the door opening, complete sealing of the opening is provided. As a result, the passage of air and moisture between the door D and the door frame face F is prevented.

Figure 5:
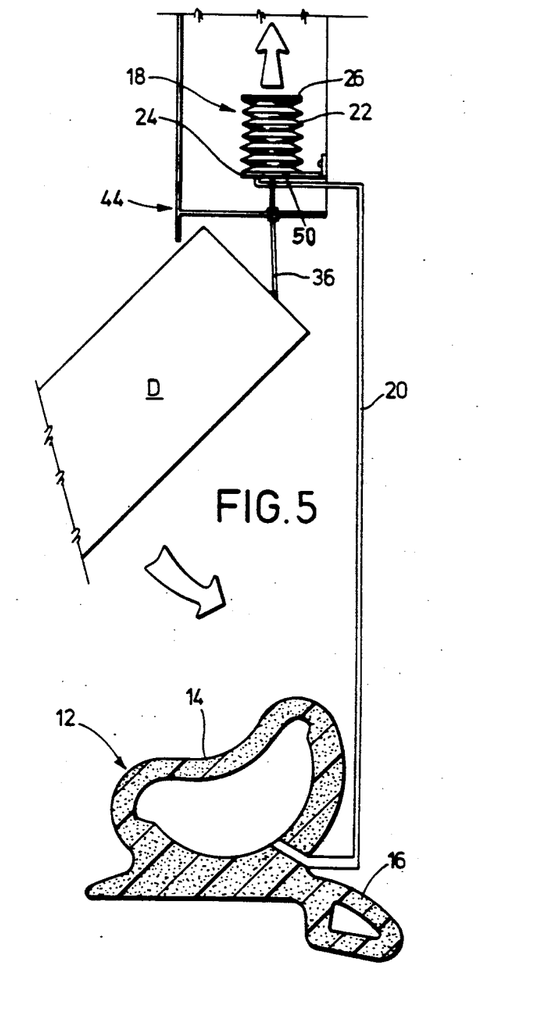
FIG. 5 is a view similar to FIG. 4 showing the operation of the apparatus of the present invention as the closure is being closed.

As best shown in FIGS. 1, 4 and 5, the sealing member 12 is connected to a bellows pump 18 by means of an air flow line 20 that attaches to a nipple 21 on the pump. Advantageously, the bellows pump 18 of the apparatus 10 is specially designed to allow mounting to the vehicle body B or the door D in a location adjacent but spaced from the door hinge area. Thus, the apparatus 10 may be incorporated into present automobile designs without any significant redesigning of the door hinge area in order to accommodate the bellows pump as has been required with past designs. In effect, the bellows pump 18 may simply be mounted in an existing cavity within the vehicle body, the wheel well or the door itself.

As described in greater detail below, when the door D is opened by swinging action, the bellows pump 18 is compressed. Thus, when the door D is closed, the bellows pump 18 is reexpanded sucking air from the tubular section 14 of the sealing member 12 so as to generate a partial vacuum in the tubular section. Thus, the sealing member 12 deflates and collapses as shown in FIG. 5. This serves to reduce the cross section of the sealing member 12 thereby reducing the degree of interference between the sealing member and the door D as the door closes and latches. The resulting decrease in the effort required to close and latch the door D significantly increases consumer satisfaction with the automobile.

Once closed, the tubular section 14 of the sealing member 12 is allowed to vent to atmosphere by designed-in leakage or bleed at the bellows as described in detail later. This serves to reexpand the sealing member 12 through resilient memory so as to provide the desired increased interference fit for maximum sealing of the door opening against the passage of air and moisture.

As best shown in FIGS. 3 and 3A, the bellows pump 18 includes a flexible, elastomeric body 22. Preferably, the body 22 is constructed of a flex fatigue-resistant material, such as the polyester elastomer Hytrel, available from E. I. duPont DeNemours of Wilmington, DE. The body 22 is sealed by means of the ends 24, 26 and may include if necessary an internal compression spring 27 constantly urging the bellows to its expanded position. The plate of mounting end 24 is specially adapted for mounting the bellows pump 18 in a cavity of the vehicle body B, such as within the fender (see FIG. 1), in the door or even in such remote locations as in the bumper. For example, the plate may include an integral mounting bracket 28 that may be fastened by bolts 30 to the vehicle body B (see FIGS. 4 and 5). Of course, however, it should be recognized that any other suitable mounting method known in the art could be utilized.

The opposite end 26 of the bellows pump 18 is relatively displaceable with respect to the mounting end 24 so as to allow actuation of the bellows pump. Displacement of the end 26 toward the end 24 compresses the elastomeric body 22 and reduces the volume of the pumping chamber 23. Conversely, displacement of the end 26 away from the end 24 expands the body 22 and increases the volume of the pumping chamber 23. Preferably, the plate forming the end 26 includes an inwardly extending portion 34 designed to displace substantially all remaining ambient air when the bellows body 22 is fully compressed (see FIG. 5) so that a more complete vacuum can be drawn.

As shown in FIG. 1, the displaceable end 26 of the bellows pump 18 is connected to the door D by means of a flexible cable 36. The cable 36 extends through an aperture in the end 26. A knot 38 at the end of the cable 36 prevents the cable from pulling through the aperture while also serving to seal the same. The cable 36 passes through the pumping chamber 23 and out through a resilient sealing element 40 that sealingly engages the cable while allowing for relative sliding movement. The opposite end 42 of the cable 36 may be fixed to the door D by means of a bolt or some other method.

A flow control circuit, generally designated by reference numeral 44, directs air flow into and out of the bellows pump 18. The flow control circuit 44 includes a one-way exhaust valve 46 on the mounting end bracket 24 (FIG. 3), a one-way intake valve 48 on the opposite side of the plate of the end 24 (FIG. 3A) and also a programmed leak or bleed port 50 in the latter end (FIGS. 2 and 3).

When the door D is swung open, the cable 36 draws the plate on the displaceable end 26 of the bellows pump 18 toward the plate on the mounting end 24. Thus, the volume of the pumping chamber 23 is reduced and air is expelled from the bellows pump 18 through the one-way exhaust valve 46 into the atmosphere. It should be appreciated that the flow of the air from the bellows pump 18 to the remainder of the flow control circuit 44 is blocked by the one-way intake valve 48 (see FIG. 3A). Thus, the air flowing from the bellows pump 18 is forced to the atmosphere and does not tend to inflate the sealing member 12 through the flow line 20. As shown, both the one-way exhaust valve 46 and one-way flow valve 48 may be simple flapper check valves.

When the door D is closing, the cable 36 goes slack and the bellows body 22 reexpands through resilient memory thereby increasing the volume of the pumping chamber 23. As the chamber 23 expands, a vacuum is created in the bellows pump 18. Air from the atmosphere cannot flow past the one-way exhaust valve 46. Consequently, air is drawn into the bellows pump 18 through the intake valve 48 and the entire flow control circuit 44. The bleed port 50 is made small enough to allow the bellows pump 18 to draw air from the sealing member 12 through the feed line 20 and the one-way intake valve 48 over and above that drawn through the bleed port 50 sufficient to evacuate the tubular section 14 and thereby cause the sealing member 12 to deflate and collapse so as to assume a reduced cross section 14 (see FIG. 5). Thus, the door D closes and latches easier since the interference between the door and the vehicle body B is reduced or even substantially eliminated. Further, compression shock or air bind is reduced since air that would be otherwise trapped in the sealed passenger compartment can flow past the sealing member 12.

Following normal swift closure, the leak port 50 then allows air at ambient pressure to flow into the bellows pump 18 and thence through the air flow line 20 to again fill the tubular section 14 of the sealing member 12. As the tubular section 14 fills with air, it expands from the collapsed condition shown in FIG. 5 to the expanded, full cross section condition shown in FIG. 4. The reinflation lags slightly behind the normal swift closing due of the length of air feed line 20 and the small size of the leak port 50. In this reexpanded, full cross section condition, the sealing member 12 provides firm sealing engagement with the desired resilient interference between the door D and the vehicle body B. This resulting improved sealing serves to increase passenger comfort and owner satisfaction by reducing wind noise and preventing the passage of moisture into the passenger compartment.

While the present invention has been described and shown with the bellows pump 18 mounted to the vehicle body B adjacent the hinge area, it should be appreciated that the pump could just as easily be mounted in other convenient cavities of the vehicle. Of course, the flexible cable 36 could extend between the bellows 18 and the door along a serpentine path if necessary. Suitable guides, such as tracks, rollers or tubes, could be used to properly direct the cable 36.

Figure 5A:
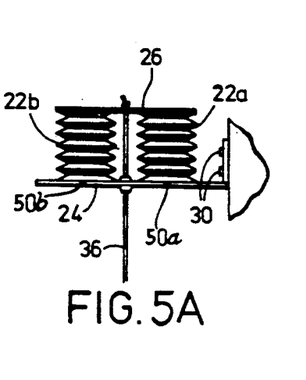
FIG. 5A is a schematical representation showing the bellows pump with a double bellows in a fully compressed state (closure open).

In the event that additional vacuum capacity is needed to collapse the tubular seal member 12, such as with luxury cars or hatch back doors, the double bellows pump 22a, 22b may be provided, as shown in FIG. 5A. In this instance, the air flow line 20 is connected to both of the bellows pumps 22a, 22b through the end mounting plate 24 and a bleed port 50a and 50b is provided for each of the respective pumps. The cable 36 rather than passing through the bellows chamber 23 is connected to the single displaceable end plate 26 between the two bellows pumps 22a, 22b. As shown in FIG. 5A, the compression by providing tension on the cable 36 is the same as with the single bellows 22. In essence, the operation is the same except that the volume capacity is doubled.

Figure 6:
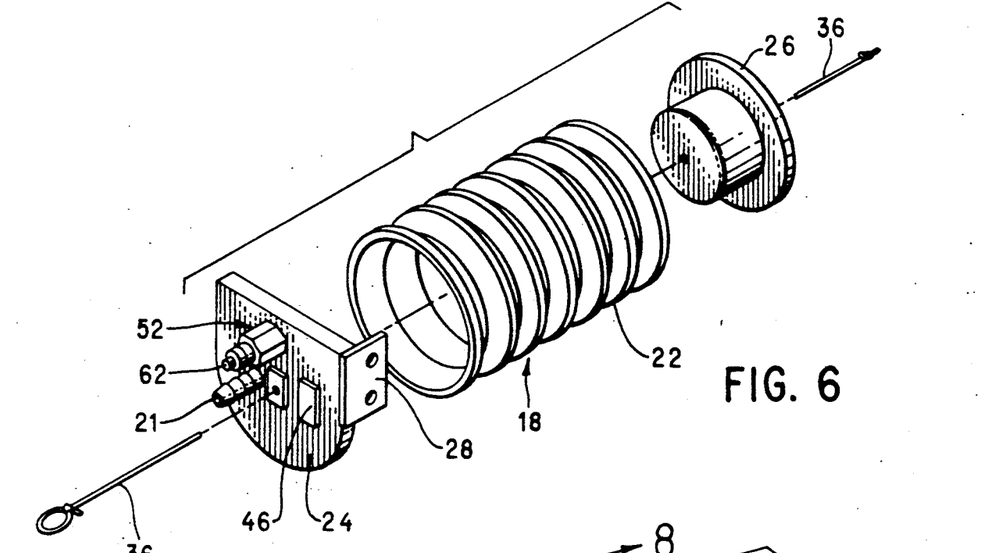
FIG. 6 is a view similar to FIG. 3 but showing another embodiment of the leak port.
Figure 7:
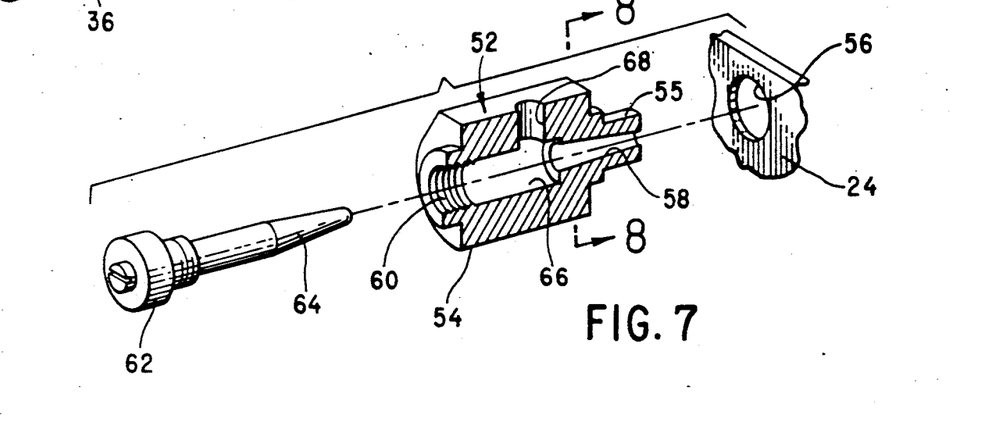
FIG. 7 is an enlarged exploded view of the leak port in FIG. 6.
Figure 8:
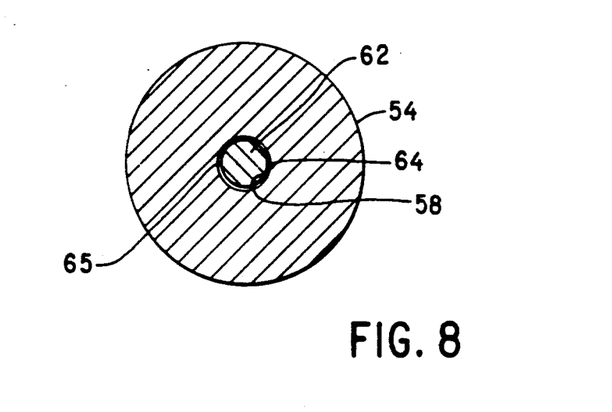
FIG. 8 is a view taken on the line 8—8 in FIG. 7.

Referring now to FIGS. 6–8, there is shown another embodiment of the leak port wherein the leakage bleed rate is made adjustable by the use of an adjustable bleed valve 52 instead of a port of fixed size (diameter). Otherwise, the parts remain like those previously described and are accordingly designated by the same numbers. The adjustable bleed valve 52 comprises a valve body 54 attached to the bellows' front end 24 by swaging over the distal end of a male extension 55 of the valve body that is received in an enlarged hole 56 in the end 24. The valve body has a tapered hole 58 by which air is allowed to flow into the bellows and a threaded hole 60 co-axial with the tapered hole. A threaded tapered pin 62 is threaded into the threaded hole 60 and has its tapered portion 64 received with clearance 65 in the tapered hole 58 (see FIG. 8) so as to allow communication of the latter with a chamber 66 in the valve body that is open to the atmosphere through a side port 68. The tapered pin portion 64 acts to precisely determine the flow of air (rate) through the tapered hole 58 according to the adjustment of the threaded pin 62 with advancement into the valve body reducing the clearance 65 and thus the flow and, alternatively, retraction of the pin increasing the flow. And this can be set either at the factory where the desired rate is already specified or may be set later according to end use requirements.

Figure 9:
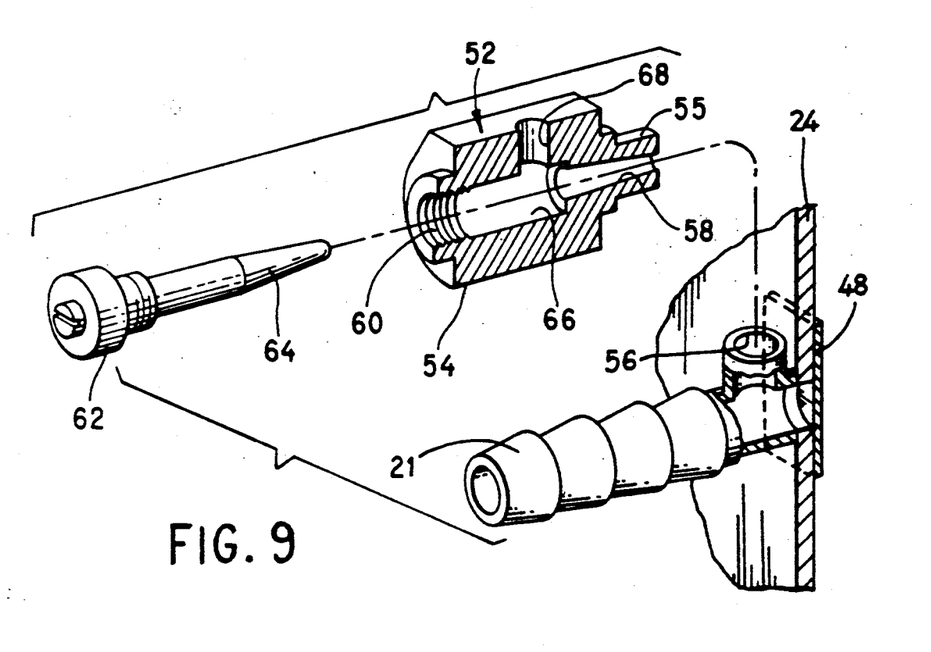
FIG. 9 is an enlarged exploded view of another embodiment of the leak port.

Referring now to FIG. 9, there is shown another embodiment of the leak port wherein the port is more strategically located as well as the bleed rate therethrough being made adjustable by the valve 52 as in the FIG. 7 embodiment. In the latter, the bleed off of the vacuum in the sealing member 12 is dependent on the operating characteristics of the flapper 48 as to when the vacuum in the seal is fully relieved. This dependency is made considerably less by the FIG. 9 embodiment by providing a side hole 56A in the nipple 21 which is on the deflatable seal side of the flapper valve 48 and attaching the adjustable bleed valve 52 to this relocated bleed hole.

In summary, numerous benefits have been described which result from employing the concepts of the present invention. Advantageously, the apparatus 10 of the present invention is specially adapted to provide swinging vehicular closures that require reduced closing effort while also providing good interference sealing. As the door D is closed, the door opening sealing member 12 is deflated to reduce interference engagement and allow closing and latching the door with less effort. Further, at the instant of closing, air can flow past the sealing member so that the annoying problem of compression shock is substantially eliminated. Immediately upon closing, the sealing member is passively vented (i.e., without valve operation) allowing expansion by resilient memory to full cross section so as to provide interference engagement with the door for maximum sealing.

As a further advantage, the bellows pump 18 with the attendant fixed bleed port 50 or adjustable bleed valve 52 for deflating the sealing member 12 is specially designed so as to allow mounting at any convenient location, such as a cavity within the vehicle body B or door D. More specifically, the bellows pump 18 includes a flexible actuator in the form of the cable 36 that may even be extended around guides from remote locations. In this way, the present apparatus is not limited to installation on only full or luxury model cars where sufficient room exists in the door hinge area for the mounting of a bellows pump. Further, there is no need to redesign the door hinge area to accommodate a bellows pump.

The foregoing description of the preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. An apparatus for sealing between a closure and a body such as a door and door frame of a vehicle, comprising:

a deflatable sealing member for resilient interference engagement between said closure and said body;

vacuum source means in the form of a bellows actuatable by resilient memory to form a vacuum when connected to said deflatable sealing member; means for mounting said bellows at one end to one of said closure or said body and including an opposite, relatively displaceable end for actuating said bellows to condition said bellows for actuation by resilient memory;

means for connecting said relatively displaceable end of said bellows to the other of said closure or said body to contract said bellows for actuation by resilient memory only during opening of said closure, said bellows being expanded by resilient memory during closing of said closure; and a flow control circuit connected to said bellows including first valve means operable to open said bellows to atmosphere during contraction of said bellows, second valve means operable to connect said sealing member to said bellows during actuation by resilient memory to deflate said sealing member to a reduced cross section only during closing of said closure so as to allow passage of air from inside the vehicle past said sealing member to substantially reduce closing effort and eliminate compression shock, and adjustable bleed valve means having an adjustable bleed port directly continuously connecting said deflatable sealing member with atmosphere, said bleed port being adjustable to a size that assuredly allows said bellows to overcome air flowing from the atmosphere through said bleed port into said bellows during contracture so as to effect the deflation of said sealing member but also assuredly allows the internal pressure of said sealing member to fully return to atmospheric pressure and expand said sealing member by resilient memory to full cross section after closing of said closure so as to provide firm sealing engagement with the desired resilient interference between said closure and said body in various sealing installations having different air bleed requirements.

2. An apparatus for sealing between a closure and a body such as a door and door frame of a vehicle, comprising:

a deflatable sealing member for resilient interference engagement between said closure and said body;

vacuum source means in the form of a bellows connected to said deflatable sealing member; means for mounting an end of said bellows to one of said closure or said body, said bellows having an opposite, relatively displaceable end for actuating said bellows remote from the other of said closure or said body;

means for remotely connecting said relatively displaceable end of said bellows to the other of said closure or said body, said connecting means including a cable extending through said mounting end of said bellows and flexible for actuating said bellows to reduce the volume thereof only during opening of said closure, said bellows being actuatable by resilient memory and the slackening of said cable only during closing of said closure to create a vacuum, means being provided on said mounting end for sealingly engaging said cable; and flow control means including an exhaust check valve connected to said bellows and openable upon opening of said closure to reduce the volume of said bellows in response to actuation by said cable and an intake check valve connected to said bellows and openable during closing of said closure in response to actuation of said bellows by said resilient memory to admit atmospheric air into said bellows, a flow line connected between said intake check valve and said deflatable sealing member, and adjustable bleed valve means having a bleed port of variable size directly continuously connecting said deflatable sealing member with atmosphere for assuring said sealing member is deflated to a reduced cross section only during closing of said closure by a vacuum in the bellows and through said intake check valve and for assuring that the internal pressure of said sealing member is allowed to fully return to ambient pressure after closing by flow of ambient air through said bleed port, whereby passage of air is allowed from inside the vehicle past said sealing member to substantially reduce closing effort and eliminate compression shock and said sealing member expands by resilient memory to full cross section after closing of said closure so as to provide firm sealing engagement with the desired resilient interference between said closure and said body.

3. An apparatus as set forth in claim 2 wherein said bleed port is located in said flow control circuit between said sealing means and said intake check valve.

* * * * *